United States Patent [19]

Bowker

[11] Patent Number: 5,206,902
[45] Date of Patent: Apr. 27, 1993

[54] NETWORK SIGNALING ARRANGEMENT FOR CONTROLLING TANDEM NETWORK FUNCTIONS

[75] Inventor: Duane O. Bowker, Neptune City, N.J.

[73] Assignee: AT&T Bell Laboratories, Murray Hill, N.J.

[21] Appl. No.: 677,903

[22] Filed: Apr. 1, 1991

[51] Int. Cl.⁵ .................. H04M 3/22; H04M 7/00; H04Q 1/54
[52] U.S. Cl. .................. 379/220; 379/229; 379/235; 379/343; 379/408
[58] Field of Search .......... 379/343, 338, 408, 221, 379/220, 414, 229, 224, 235, 410; 340/425, 827

[56] References Cited

U.S. PATENT DOCUMENTS

| | | | |
|---|---|---|---|
| 2,350,951 | 6/1944 | Zinn | 379/343 X |
| 3,114,005 | 12/1963 | Kuhn | 379/235 |
| 3,183,313 | 5/1965 | Cutler | 379/408 |
| 3,306,982 | 2/1967 | Ericsson | 379/32 |
| 3,397,402 | 8/1968 | Schneider | 346/37 |
| 3,414,688 | 12/1968 | Hermes et al. | 340/425 |
| 3,706,862 | 12/1972 | Chambers, Jr. | 340/425 |
| 4,320,257 | 3/1982 | Warman | 379/202 |
| 4,638,298 | 1/1987 | Spiro | 340/827 |
| 4,665,383 | 5/1987 | Desjardins | 340/506 |
| 4,811,334 | 3/1989 | Matt | 379/229 X |
| 4,882,749 | 11/1989 | Zuk | 379/346 |

OTHER PUBLICATIONS

*IEE Vacation School on Switching and Signaling in Telecommunications Networks 1986*, "Signalling", S. Welch, pp. 10/1–11/40.

Primary Examiner—Thomas W. Brown
Attorney, Agent, or Firm—F. B. Luludis

[57] ABSTRACT

A facility for establishing a signaling link over a telecommunications network connection formed by a number of network switches is provided so that an upstream switch may communicate with a downstream switch in the connection. The facility is particularly useful in controlling the number of times that signals traveling over the connection are subjected to a particular function.

13 Claims, 2 Drawing Sheets

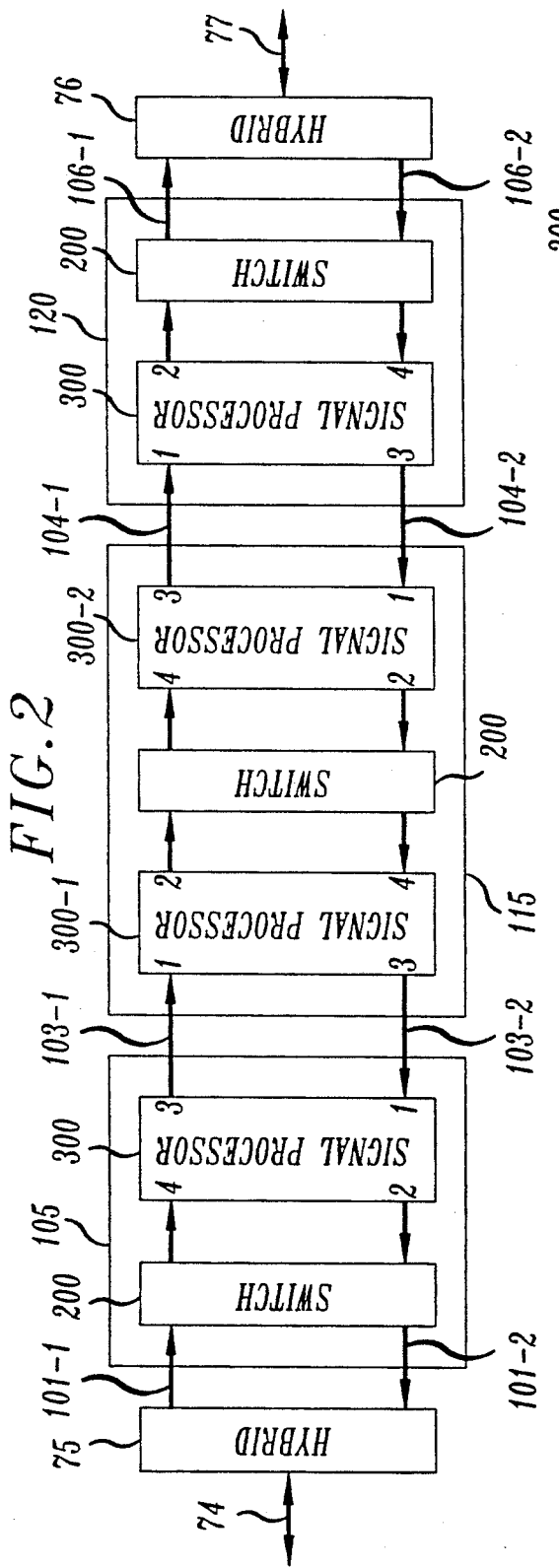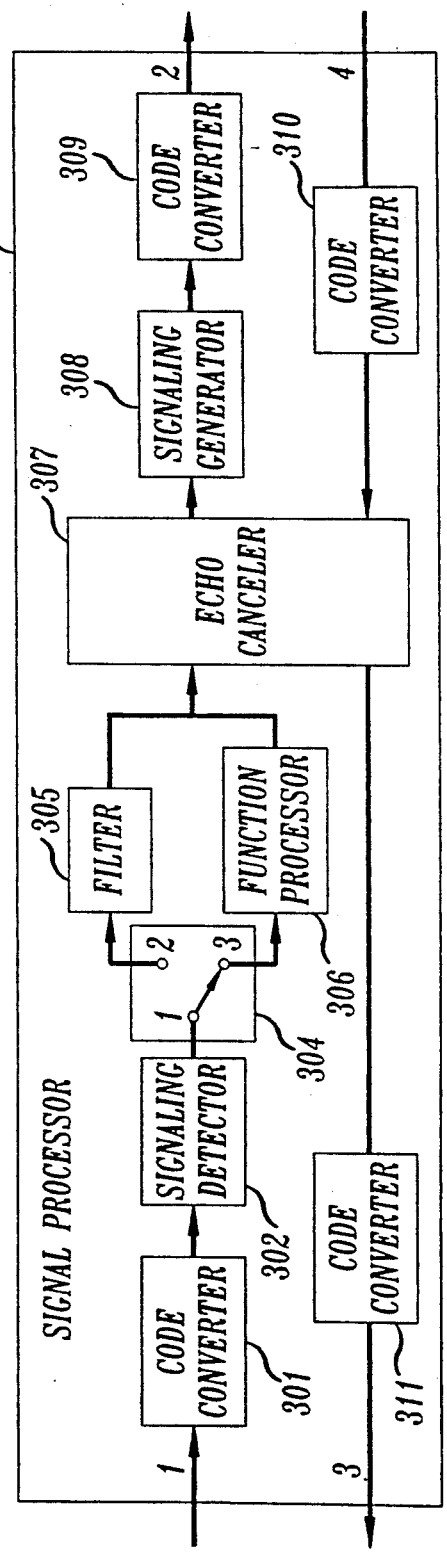

NETWORK SIGNALING ARRANGEMENT FOR CONTROLLING TANDEM NETWORK FUNCTIONS

TECHNICAL FIELD

The invention relates to telecommunications networks and more particularly relates to a method of precluding one or more network elements (nodes) involved in the establishment of a network connection from performing a particular function.

BACKGROUND OF THE INVENTION

As is well-known, the function of a telecommunications network is to establish a connection between a calling station and a called station. Once such a connection is established, then the calling and called stations may begin to exchange signals, for example, voice signals, with one another. Typically, elements in the connection, or path, operate to perform a particular function in the transmission of such signals. For example, an echo canceler, which is typically contained in a network connection, operates to cancel out of speech signals that it receives so-called echo signals to prevent the latter signals from being returned to the source of the speech signals, i.e., a telephone station set.

As another example, other network elements contained in a connection may operate to perform a different function on signals as they pass through the network. For example, one such element may be arranged to selectively raise the level of speech signals residing in the baseband, e.g., 100 Hz through 300 Hz, as disclosed in copending U.S. patent application of Ser. No. 07/620997 filed on Dec. 3, 1990 on behalf of D.O. Bowker et al. and allowed Sep. 21, 1992.

Thus, the transmission of signals through a network connection may be enhanced by subjecting such signals to a number of different signal processing functions. In certain situations, however, the quality of such signals could be degraded if they were subjected more than once to the same signal processing function. For example, if the function that selectively raises the level of baseband speech signals were applied more than once to such signals, then the level of the baseband signals relative to the remainder of the band would be exceedingly high, thereby possibly distorting such signals before they are delivered to a receiving telephone station set. As another example, and as mentioned above, it si advantageous to pass speech signals through an echo cancellation process to remove echo signals. However, passing speech signals through additional echo cancelers that may be in a connection would not improve the quality of such signals. In fact, doing so could degrade the quality of speech signals, since the level of so-called quantization distortion, which is a by-product of the echo cancellation process, would increase.

Accordingly, there appears to be a need for controlling the number of items that signals, or the like, may be subjected to a particular network function.

SUMMARY OF THE INVENTION

The art of telecommunications switching and signaling is advanced by arranging particular network elements which perform a particular function such that the first of such elements that performs the function notifies other such elements to preclude them from performing the function. Specifically, a network element which performs a particular function notifies other such elements of that fact by, in accord with the invention, establishing a simple signaling link over the network connection, thereby precluding similar elements disposed downstream in the connection from performing that function. Accordingly, a network element disposed in a connection performs a particular network function based on whether not the signaling link is present.

In an illustrative embodiment of the invention, a signal having a predetermined frequency, for example, a frequency of twenty Hz, is used to implement the signaling link, in which an element that performs the function also generates the twenty Hz signal and transmits the signal over the network connection so that other such elements arranged to detect that signal are notified that the function has been performed. Accordingly, the latter elements will abstain from performing the function.

BRIEF DESCRIPTION OF THE DRAWINGS

In the FIGS.

FIG. 2 illustrates an example of a multipath connection that may be established by the toll switches, or nodes, of the network of FIG. 1;

FIG. 3 is a broad block diagram of a signal processor that is disposed at a number of points within the multipath connection of FIG. 2.

DETAILED DESCRIPTION

Figure 1:
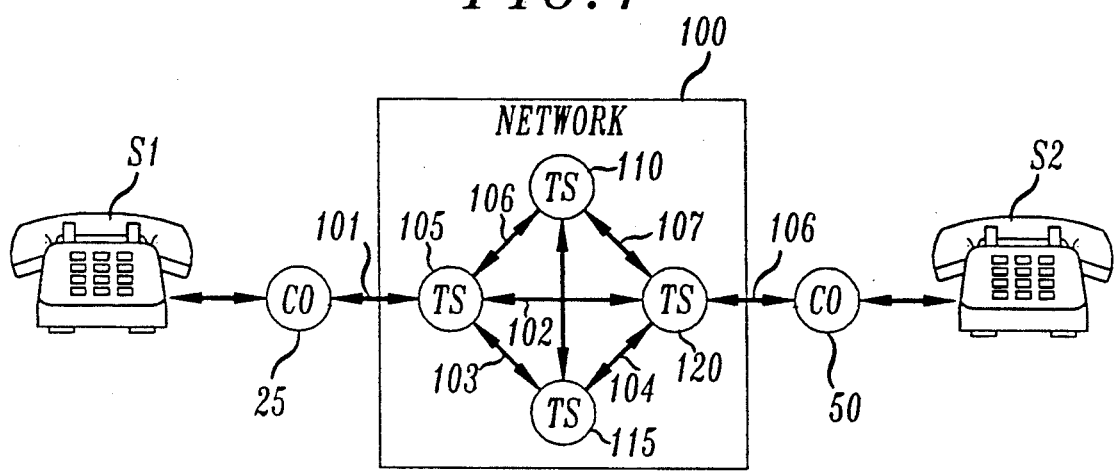
FIG. 1 is a broad block diagram of a telecommunications network in which the principles of the invention may be practiced.

Turning now to FIG. 1, there is shown a simplified block diagram of a telecommunications network 100, which may be, for example, the AT&T long distance telephone network. As is well-known, the AT&T network comprises, inter alia, a plurality of toll offices (nodes), a number of which are shown in the FIG., such as toll offices 105, 110, 115 and 120. Such toll offices are interconnected to one another to provide long distance voice and data connections for network subscribers, such as the telephone users associated with stations S1 and S2. The manner in which a network 100 telephone connection is established between users, e.g., the users associated with stations S1 and S2, is well-known and will not be discussed herein. However, it suffices to say that a telephone user, e.g., the user at S1, may establish such a connection by causing station S1 to go "off-hook" and then dialing the telephone number associated with a called party, e.g., the user at station S2. Local Central Office (CO) 25 serving station S1 collects the digits as they are dialed and establishes a connection 101 to a network 100 toll office, e.g., toll office 105 (also referred to herein as a Toll Switch (TS).) Toll office, or switch, 105, in turn, and based on the dialed telephone number that it receives from local central office 25, establishes a connection 102 to a so-called destination toll switch, such as toll switch 120. Destination toll switch 120, in turn, extends the connection via path 106 to CO 50 serving station S2 and passes to that CO the dialed telephone number. The latter CO responsive to receipt of the telephone number then extends the connection to station S2. The users respectively associated with stations S1 and S2 may then speak to one anther via the established connection, which includes the direct path 102 between toll switches 105 and 120.

It can be appreciated, whoever, that such a direct path between toll switches may not always be established. Such a situation is likely to occur when the level of traffic being carried by the direct path reaches a critical level, in which case the direct path would be marked as being "blocked". Accordingly, subsequent traffic between the toll switches connected to the opposite ends of the blocked path would be routed via an alternate path, which may involve one or more other toll switches. For example, if, in the above example path 102 is marked blocked, then an alternate connection between toll switches 105 and 120 may be established via one or more intermediate toll switches, such as toll switch 110 or 115. In either case, the end-toend connection would include multiple paths, such as, for example, path 103 between toll switches 105 and 115 and path 104 between toll switches 115 and 120.

In a network, such as network 100, signal processing equipment operative for performing a particular function, e.g., filtering speech or other types of signals, is typically sued to interface a toll switch with the intertoll network. For example, such equipment is used to respectively interface toll switch 105 with internetwork (intertoll) paths 102, 103 and 106. Similarly, the other ends of the latter paths would also use such equipment to interface with nodes 120, 115 and 110, respectively.

Consequently, as a result of such interfacing a network 100 connection comprising multiple paths could subject speech or other signals to multiple signal processing functions, which could degrade the quality of such signals.

For example, signal processing equipment that is used to interface switch 105 (120) with path 103 (104) would operate to perform a particular processing function on signals transmitted by station S1 (S2), in which the function may be, for example, echo canceling, or enhancing the quality of such signals by increasing the level of those signals within the baseband. Similarly, signal processing equipment that is used to interface path 103 (104) with switch 115 would also perform the same function on the station S1 (S2) signals.

As is well-known, so-called quantization noise could be generated as a byproduct of the echo canceling process. Typically, the level of such quantization noise is not appreciable to affect the overall quality of the signals being processed. However, when such signals are subjected to multiple echo canceling processes then the level of quantization noise could be appreciable. If, on the other hand, the processing function is geared toward increasing the level of baseband signals by a predetermined factor, e.g., 11 dB, then subjecting such signals to multiple increases would result in baseband signals having an inordinately high level in relation to the other signals in the speech band.

This problem is dealt with by arranging signal processing equipment (element) adapted to perform a desired function, so that it establishes, in accord with the invention, a simple signaling link to notify other such equipment that may be present in the connection that the desired function has been performed. In this way, signal processing equipment associated with a first path of a network multipath connection may prevent signal processing equipment that may be associated with a succeeding, intermediate path that may be in the connection from performing the desired function. Accordingly, the presence or absence of the signaling link is used to control whether or not "downstream" signal processing equipment performs the desired function.

In an illustrative embodiment of the invention, such a signaling link between signal processing equipment is achieved by generating a predetermined signal and transmitting the signal over the voice path connection, in which the predetermined signal, may be, for example, a subsonic signal having a frequency of, for example, twenty Hz.

Referring now to FIG. 2, there is shown a more detailed block diagram of one multipath connection that may be established between stations S1 and S2 (not shown in the FIG.), in which the connection involves toll switches 105, 115 and 120. (Toll switch 115 will also be referred to herein as the intermediate, or via, switch).

Each of the toll switches forming network 100 includes, inter alia, a telephone switch 200, which, as mentioned above, may be the well-known No. 4ESS switch available from AT&T. It is seen from the FIG. that a signal processor 300, commonly referred to as an echo canceler, is used to interface a switch, e.g., switch 200 of toll switch 105, with internetwork (intertoll) path, e.g., path 103. Each of the communications paths 101, 103, 104 and 106 is shown in the FIG. as two oppositely directed transmission paths for transporting speech signals received from a respective one of the stations sets S1 and S2. Thus, for example, path 103 is shown as paths 103-1 and 103-2. (It is assumed herein that speech signals received from station S1 via path 74 and two-wire-to-four-wire hybrid 75 are transported from left to right through network 100 and that speech signal received from station S2 via path 77 and two-wire-to-four-wire hybrid 76 are transported in the opposite direction through network 100).

In particular, as is well-known, signal processor 300 performs a number of functions. As mentioned above, one such function is the cancellation of an echo signal that may be present in speech signals. An echo signal is a reflection of a transmitted signal and typically occurs as a result of an impedance mismatch between a transmission medium, e.g., a telephone communications path and a two-wire-to-four-wire hybrid, such as either hybrid 75 and 76. (It is noted that a hybrid is typically associated with a CO, such as COs 25 and 50 (FIG. 1) and may be disposed at either the line side or trunk side of a CO. In certain instances, a hybrid may be associated with a toll switch). Accordingly, signal processor 300 of toll switch 120 operates in a well-known manner to compare transmitted speech signals received via path 104-1 with signals propagating in an opposite direction via path 104-2, and "cancel out" the latter signals if they are found to be echoes of the transmitted speech signals. The signal processor 300 contained in toll switch 105 performs a similar function by comparing transmitted speech signals received via path 103-2 with signals traveling in an opposite direction via path 101-1.

In addition, the echo cancellation function performed by the signal processors 300 contained in toll switches 105 and 120 is also performed by signal processors 300-1 and 300-2 contained in toll switch 115. In certain situations it may be desirable to inhibit processors 300-1 and 300-2 from performing the echo cancellation function.

Another function that a signal processor 300 may perform is the enhancement of speech signals, as mentioned above. As also mentioned above, it may be desirable to inhibit processors 300-1 and 300-2 from performing that function or the echo cancellation function when toll switch 115 is positioned as the intermediate switch in a multipath connection. In the following discussion it will be assumed that the inventive signaling link operates to prevent duplication of the speech signal enhancement function. However, such an assumption should not be construed as a limitation, since the invention may be readily adapted to inhibit a device from executing a completely different function, such as, for example, socalled low bit-rate voice coding.

Turning then to FIG. 3, there is shown a more detailed block diagram of signal processor 300 having four ports respectively designated as 1, 2, 3 and 4, in which transmitted speech signals received via port 1 are presented to code converter 301. Conventional code converter 301 operates to convert speech signals encoded in the well-known mu-255 law format (or in certain instances a so-called A-law format) into a linear format for presentation to signaling detector 302. Signal detector 302 operates in accord with the invention to detect the possible presence f a signaling link that may have been originated by an up-stream toll switch to prevent succeeding toll switches in a path from performing a desired function, such as the aforementioned speech signal enhancement.

Specifically, signal detector 302, which may be, for example, a conventional Digital Signal Processor (DSP) arranged as a notch filter centered at a predetermined frequency—illustratively 20 Hz—operates to pass to filter 305 via terminals 1 and 2 of switch 304 the coded signals that are received from code converter 301 based on detecting continuously for a predetermined period of time—illustratively one second—the presence of the signaling link (e.g., 20Hz signal).

Figure 4:
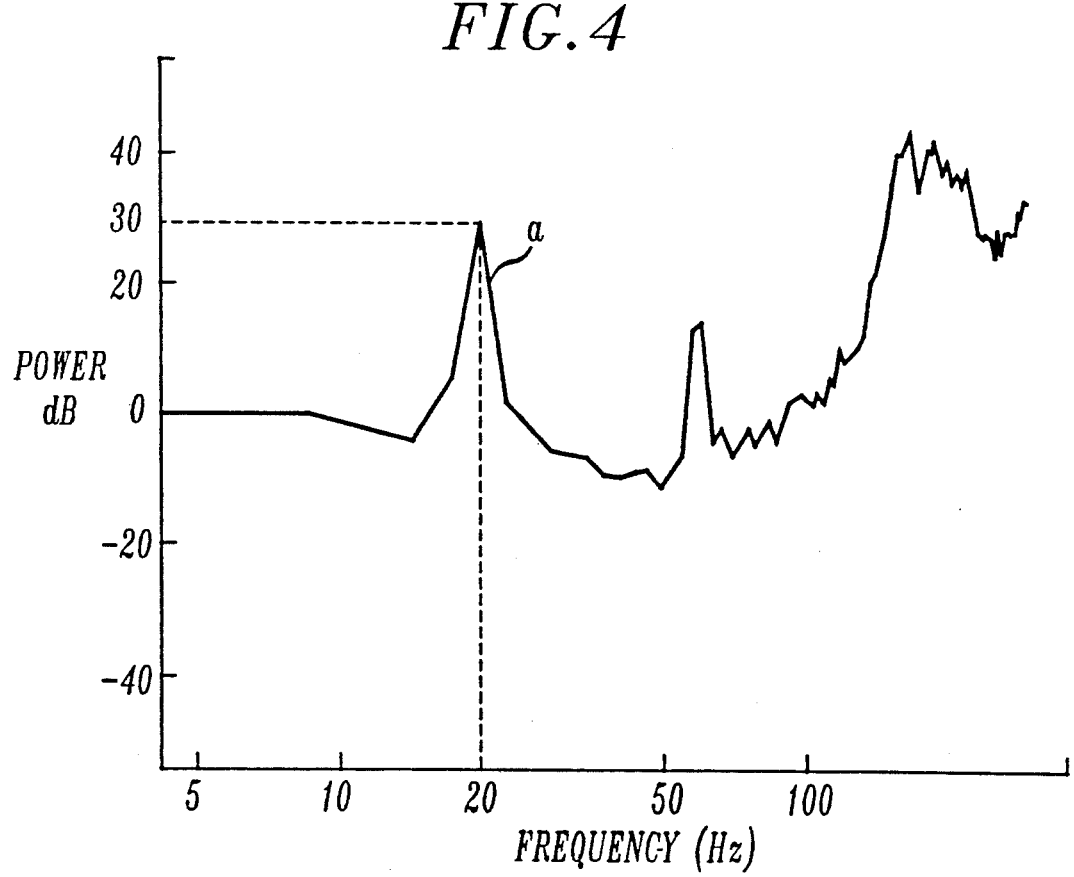
FIG. 4 illustrates graphically one example of a signaling link that may be imposed, in accordance with the principles of the invention, at a point along the multipath of FIG. 2.

Briefly referring to FIG. 4, the signaling link is established by continuously transmitting over a voice path connection a predetermined signal, such as signal "a", which is centered at 20 Hz and has an energy level of approximately 30 decibels. Thus, the continuous presence of signal "a" confirms that the signaling link from one switch to another "downstream" switch has been established. In addition, the 20 Hz signaling link is distinguished from an extraneous 20 Hz signal that may be present due to, for example, noise, by further arranging detector 302 so that it confirms the presence of the signaling link only when the detected 20 Hz signal is continuous for at least one second (as mentioned above) and has an energy level of at least 20 decibels.

Returning to FIG. 3, if detector 302 does not detect the signaling link, then detector 302 passes to function processor 306 via terminals 1 and 3 of switch 304 the coded signals. If, on the other hand, detector 302 does detect the presence of the signaling link, then detected 302 passes to filter 305 the coded signals.

(It is noted that in an illustrative embodiment of the invention, switch 304 may be a digital multiplexer, which, for the sake of clarity and simplicity, is functionally shown in the FIG. as switch 304).

Filter 305, which may be, for example, a DSP, is arranged as a conventional bandpass filter for filtering out of the coded signals the aforementioned signaling link and then passing the resulting coded speech signals to echo canceler 307. Conventional echo canceler 307 operates in the manner discussed above. That is, canceler 307 compares the coded speech signals that it receives from filter 305 with signals received via port 4 and cancels the latter signal if they represent echoes of the speech signals. Canceler 307 then presents the coded speech signals to signal generator 308. If the signals received via port 4 are found not to be echoes, then such signals are outputted via port 3 to a next element in the network connection.

Conventional signal generator 308, which may be, for example, a DSP, generates the signaling link (e.g., 20 Hz signal), combines it with the coded speech signals that it receives from canceler 30 and presents the result to code converter 309. (It is noted that generator 308 generates the signaling link regardless of whether or not the signaling link is present/absent at the input to detector 302). Code converter 309 in a conventional manner converts the linear encoded signals that it receives at its input into the mu-255 law format (or A-law format) and presents the result to port 2.

As mentioned above, if the signaling link is not present, then the coded speech signals rare presented to function processor 306. In the present illustrative example of the invention, function processor 306, may be, for example, a digital filter, which multiples the response of the speech signals that it receives with a predetermined response curve to enhance the level of those speech having frequencies in the baseband. Such a response curve may be the one shown in FIG. 2 of the above-mentioned D.O. Bowker et al patent application, in which the response curve is characterized by the filter 306 coefficients. Accordingly, those speech signals having frequencies below, for example, 300 Hz, are multiplied by the response of filter 306 which raises the energy level of those signals by a predetermined value, for example, a value of 10 to 15 decibels. Speech signals having frequencies above, for example, 300 Hz, are multiplied by the remainder of the filter response, which raises the level of those signals by another predetermined value, for example, a value of 0 decibels.

Speech signals which have been subjected to the function performed by function processor 306 are then presented to echo canceler for further processing, in the manner discussed above.

It is seen from the FIG. that signal processor 300 also includes code converters 310 and 311. Converter 310, like converter 301, converts mu-255 law encoded speech signals received via port 4 into a linear format for presentation to canceler 307. Converter 311, like converter 309, converts linear encoded speech signals into a mu-255 law format for presentation to port 3.

With the foregoing in mind, reference is now made to both FIGS. 2 and 3. Considering only speech signals received via path 74, such signals are passed via hybrid 75 and path 101-1 to switch 200 of toll switch 105. Such speech signals then travel through a connection established by that switch to a toll trunk connected to port 4 of processor 300 associated with toll switch 105. If the speech signals do not represent echoes then the latter processor 300 presents the speech signals to path 103-1 of the intertoll network, which is connected via the network to port 1 of signal processor 300-1.

It can be appreciated that so far the speech signals have not been subjected to the enhancement function performed by function processor 306. As such, the speech signals would not be accompanied by the signaling link. That fact would, however, be detected by the signaling detector 302 contained in processor 300-1, since the speech signals arrive via port 1 of that processor. Accordingly, the signaling detector 302 of processor 300-1 would cause the speech signals to pass through the associated function processor 306. In addition, the signaling generator 308 contained in signal processor 300-1 would introduce the signaling link, e.g., combine the speech signals with a 20 Hz signal, and present the result via the associated code converter 309 to port 2 of processor 300-1. The speech signals would then be extended to switch 200 of toll switch 115 to port 4 of signal processor 300-2.

Since such speech signals do not represent an echo signal, processor 300-2 would then present the speech signals to path 104-1 of the intertoll network, which is connected to port 1 of the signal processor 300 contained in toll switch 120. In this instance, however, the associated signaling detector 302 would detect the presence of the signaling link imposed by the signal processor 300-1 contained in the upstream toll switch 120 would pass the speech signals that it receives to the associated filter 305, rather than to the associated function processor 306, thereby ensuring that the speech signals are not again subjected to the signal processing function that may be performed by the associated function processor 306.

Similarly, speech signals traveling in an opposite direction would be subjected to the function performed by function processor 306 contained in signal processor 300-2. When those speech signals arrive at port 1 of the signal processor 300 contained in toll switch 105, the signaling detector 302 contained therein would detect the presence of the accompanying signaling link, and, therefore, would pas the speech signals to the associated filter 305, rather than to the associated function processor 306.

It is noted that if the path does not contain at least one intermediate toll switch, e.g., toll switch 115, then, in that instance, speech signals received via path 74 would be subjected to the function performed by the function processor 306 contained in the signal processor 300 associated with toll switch 120. The reason for this, is that the speech signals would not be accompanied by the signaling link when they arrive at port 1 of the latter signal processor 300. For a similar reason, speech signals traveling in an opposite direction would be subjected to the function performed by the function processor 306 contained in the signal processor 300 associated with toll switch 105.

The foregoing is merely illustrative of the principles of the invention. Those skilled in the art will be able to devise numerous arrangements, which, although not explicitly shown or described herein, nevertheless embody those principles that are within the spirit and scope of the invention. For example, a number of such signaling links may be established in a network connection to control the operation of a number of different functions that may be performed in a network connection. In such an instance, such signaling links may be represented by the presence or absence of respective subsonic signals having respective frequencies of, for example, 20 Hz, 30 Hz, 40 Hz, etc. As another example, networks which employ low-rate encoding of speech signals to achieve increased capacity could improve their end-to-end performance by limiting, in accord with the present invention, the number of times that speech signals transported by a connection are subjected to such a low-rate encoding function.

I claim:

1. A method of establishing a signaling link between elements contained in a communications network connection so that one such element may notify succeeding elements in the connection that a particular network function has been performed, said method comprising the steps of responding at one of said elements to receipt of speech signals by subjecting said speech signals to a predetermined network function, and establishing said signaling link between said one of said elements and a next one of said elements in said connection by combining said speech signals after they have been subjected to said predetermined function with said signaling link and then passing said combination to said next one of said elements.

2. The method set forth in claim 1 wherein said elements are respective network toll switches 3. The method set forth in claim 1 wherein said method includes the steps of responding at said next one of said elements to the receipt of said signaling link by not subjecting said speech signals to said predetermined network function.

4. The method set forth in claim 3 wherein said step of establishing includes the step of establishing said signaling link regardless of whether or not said speech signals are subjected to said function.

5. The method set forth in claim 1 wherein said signaling link is a subsonic signal.

6. The method set forth in claim 1 wherein said signaling link is a signal having a frequency of twenty Hz.

7. The method set forth in claim 1 wherein said step of responding by subjecting includes the step of detecting for the presence or absence of said signaling link and passing said speech signals directly to an associated signal processor arrangement if said signaling link is present or passing said speech signals to a processor for performing said predetermined function and thence to said signal processor arrangement if said signaling link is absent.

8. In a telecommunications network connection established by individual ones of a plurality of elements forming said network a method of controlling which of said individual ones of said elements subject particular signals received via said connection to a predetermined function, said method comprising the steps of at a particular one of said elements (i) performing said function of said signals, (ii) responding to said performing by establishing a signaling link to a next succeeding one of said ones of said elements to indicate that said function has been performed and (iii) supplying said signals to said next succeeding one of said elements, and at said next succeeding one of said elements responding to the presence of said signaling link by not performing said function on said signals.

9. The method set forth in claim 8 wherein said elements are respective toll switches.

10. The method set forth in claim 8 wherein in step (ii) establishing said signaling link regardless of whether or not said function is performed on said particular signals.

11. The method set forth in claim 8 wherein said signaling link is a subsonic signal.

12. The method set forth in claim 8 wherein said signaling link is a signal having a frequency of twenty Hz.

13. The method set forth in claim 89 wherein said step of performing includes the step of detecting for the presence or absence of said signaling link and passing said signals directly to an associated signal processor arrangement if said signaling link is present or passing said particular signals to a processor operative for performing said predetermined function and thence to said signal processor arrangement if said signaling link is absent.

* * * * *